US012760125B2

(12) United States Patent
Zhuo et al.

(10) Patent No.: US 12,760,125 B2
(45) Date of Patent: Oct. 13, 2026

(54) METHOD FOR PREPARING RESISTANT DEXTRIN

(71) Applicant: SHANDONG BAILONG CHUANGYUAN BIO-TECH CO., LTD., Shandong (CN)

(72) Inventors: Hongjian Zhuo, Shandong (CN); Xingjing Zhang, Shandong (CN); Zhaobo Gan, Shandong (CN); Qian Du, Shandong (CN); Mingzhan Zhang, Shandong (CN); Shuangshuang Liu, Shandong (CN)

(73) Assignee: SHANDONG BAILONG CHUANGYUAN BIO-TECH CO., LTD, Shandong (CN)

( * ) Notice: Subject to any disclaimer, the term of this patent is extended or adjusted under 35 U.S.C. 154(b) by 184 days.

(21) Appl. No.: 18/575,020

(22) PCT Filed: Nov. 7, 2022

(86) PCT No.: PCT/CN2022/130280

§ 371 (c)(1),
(2) Date: Dec. 28, 2023

(87) PCT Pub. No.: WO2023/124542

PCT Pub. Date: Jul. 6, 2023

(65) Prior Publication Data

US 2024/0336705 A1 Oct. 10, 2024

(30) Foreign Application Priority Data

Dec. 29, 2021 (CN) ........................ 202111633963.1

(51) Int. Cl.
*C08B 30/18* (2006.01)

(52) U.S. Cl.
CPC .................................. *C08B 30/18* (2013.01)

(58) Field of Classification Search
USPC ........................................................ 536/103
See application file for complete search history.

(56) References Cited

U.S. PATENT DOCUMENTS

| | | | | |
|---|---|---|---|---|
| 10,479,840 | B2 * | 11/2019 | Dou | C08B 30/18 |
| 2018/0094082 | A1 | 4/2018 | Dou et al. | |
| 2020/0385494 | A1 | 12/2020 | Wesolek | |

FOREIGN PATENT DOCUMENTS

| | | | | |
|---|---|---|---|---|
| CN | 105542019 | A | 5/2016 | |
| CN | 106117375 | A | 11/2016 | |
| CN | 106318991 | A | 1/2017 | |
| CN | 106755203 | A | 5/2017 | |
| CN | 108503716 | A | 9/2018 | |
| CN | 111363052 | A | 7/2020 | |
| CN | 111718973 | A | 9/2020 | |
| CN | 112480276 | A * | 3/2021 | C08B 30/18 |
| CN | 114262387 | A | 4/2022 | |
| EP | 3409693 | A1 | 12/2018 | |

OTHER PUBLICATIONS

First Office Action and Search mailed Jun. 22, 2022, in Chinese patent Application: 202111633963.1 10 pages.
International Search Report mailed Feb. 9, 2023, in the International Application No. PCT/CN2022/130280. 4 pages.

* cited by examiner

*Primary Examiner* — Traviss C Mcintosh, III
(74) *Attorney, Agent, or Firm* — Wilmer Cutler Pickering Hale and Dorr LLP

(57) ABSTRACT

The present application relates to a method for preparing resistant dextrin, and belongs to the technical field deep processing of starch. By means of the present disclosure, proteins are firstly removed from starch milk, and then hydrolysis, evaporation concentration, polymerization, refining and purification are sequentially carried out to finally obtain a resistant dextrin, and by means of controlling the content of proteins in the starch milk, Maillard reaction is effectively reduced, the content of dietary fibers in a crude product and the light transmittance of a product are increased, the sharing of subsequent refining and purification is reduced, the consumption of activated carbon and acid and alkali is reduced, and the cost of refining and purification is reduced.

7 Claims, No Drawings

METHOD FOR PREPARING RESISTANT DEXTRIN

CROSS REFERENCE

This present application is a national stage application of International Application No. PCT/CN2022/130280, entitled "METHOD FOR PREPARING RESISTANT DEXTRIN," filed on Jul. 11, 2022, which claims priority to Chinese Patent Application No. 202111633963.1, filed on Dec. 29, 2021 the content of each of which is incorporated herein by reference in its entirety.

TECHNICAL FIELD

The present disclosure relates to the technical field of starch deep processing, and in particular to a method for preparing resistant dextrin.

BACKGROUND ART

Resistant dextrin is a soluble dietary fiber formed by partial degradation and glycosylation transfer of corn starch or other starches. Resistant dextrin molecule contains α-1,2 glycosidic bond and α-1,3 glycosidic bond. Resistant dextrin molecule also contains dextran and β-1,6 glucoside structure. Resistant dextrin molecule also contains many irregular structures. The special molecular structure gives the resistant dextrin special physical and chemical properties and physiological functions. Resistant dextrin is a white or slightly yellow powder with a slight sweet taste. It is easily soluble in cold water and insoluble in ethanol, the viscosity of its aqueous solution is low, and the viscosity is less affected by shear rate and temperature. Resistant dextrin is resistant to heat, acid, pressure, freezing, browning and storage. Adding resistant dextrin to food will not change the quality of the food. Resistant dextrin has the function of lowering blood sugar and organizing intestinal tract. Therefore, it is widely used in health products, dairy products, baby food, baked products, and meat products.

At present, the preparation and industrial production methods of resistant dextrin are mostly acid-heating methods. In the acid-heating method, starch molecules are decomposed into pyrodextrin under the catalysis of acid, and then enzymatically hydrolyzed by liquefaction enzyme and glucoamylase, and finally refined and purified to obtain resistant dextrin. This method is a random conversion mechanism, and it is difficult to control the polymerization of the product. Under high-temperature, acidic and other conditions, the residual protein in starch will produce a serious Maillard reaction, thereby affecting the color of the product.

SUMMARY OF THE PRESENT INVENTION

In view of this, the object of the present disclosure is to provide a method for preparing resistant dextrin. The preparation method provided by the present disclosure reduces the Maillard reaction, and the obtained resistant dextrin product has high dietary fiber content, high light transmittance, thereby reducing the subsequent refining burden.

The present application can significantly increase the dietary fiber content of the crude product by removing the protein in starch before the reaction, dividing the traditional dextrinization reaction into hydrolysis reaction, evaporation concentration and polymerization reaction, and controlling the corresponding conditions and parameters.

In order to achieve the above object, the present disclosure provides the following technical solutions:

A method for preparing resistant dextrin, comprising the following steps:

1) mixing a starch with water, and removing a protein to obtain a starch milk;
2) mixing the starch milk obtained in the step 1) with an acid to perform hydrolysis reaction and obtain a hydrolysis reaction solution;
3) allowing the hydrolysis reaction solution obtained in the step 2) to undergo evaporation concentration and polymerization reaction in turn to obtain a crude resistant dextrin;
4) refining the crude resistant dextrin obtained in the step 3) to obtain the resistant dextrin.

In some embodiments, the mixture obtained after mixing the starch and the water in the step 1) has a starch milk baume degree of 20° Bé to 30° Bé.

In some embodiments, the protein removal rate in the step 1) is ≥97%.

In some embodiments, the method of removing protein is vacuum rotary-drum adsorption for protein removal.

In some embodiments, during a process the protein removal by vacuum rotary-drum adsorption, a working pressure of the vacuum rotary-drum is −0.04 MPa to −0.06 MPa, and the rotation speed of the vacuum rotary-drum is 1 min/r to 3 min/r.

In some embodiments, in the step 2), a temperature of the hydrolysis reaction is 85° C. to 95° C., and a time of the hydrolysis reaction is 30 min to 90 min.

In some embodiments, in the step 3), the pressure of the evaporation concentration is −0.06 MPa to −0.098 MPa, the temperature of the evaporation concentration is 70° C. to 85° C., and the degree of the evaporation concentration is to perform evaporation until the solid has a mass percentage content of 80% to 85%.

In some embodiments, in the step 3), a pressure of the polymerization reaction is −0.06 MPa to −0.098 MPa, a temperature of the polymerization reaction is 110° C. to 130° C., and a time of the polymerization reaction is 20 min to 30 min.

In some embodiments, in the step 4), the refining comprises decolorization, desalination, and removal of non-dietary fiber carbohydrate compounds.

In some embodiments, the method for preparing resistant dextrin comprises the following steps:

1) mixing the starch and the water, and removing the protein to obtain the starch milk: in which the protein removal rate is ≥98%;
2) mixing the starch milk obtained in the step 1) with the acid to perform the hydrolysis reaction to obtain the hydrolysis reaction solution: in which the acid is at least one selected from the group consisting of hydrochloric acid, phosphoric acid, citric acid and malic acid; the acid is added in the form of an acid solution; the acid solution has a concentration of 1 wt % to 2 wt %; the acid solution is added at a mass amount of 1 3‰ to 3‰ relative to the starch mass: a temperature of the hydrolysis reaction is 85° C. to 95° C. and a time of the hydrolysis reaction is 30 min to 90 min;
3) allowing the hydrolysis reaction solution obtained in step 2) to undergo evaporation concentration and polymerization reaction in turn to obtain a crude resistant dextrin;
4) refining the crude resistant dextrin obtained in the step 3) to obtain the resistant dextrin.

The present disclosure also provides a resistant dextrin prepared by the method for preparing resistant dextrin, a dietary fiber mass percentage content of the resistant dextrin is ≥90% and a light transmittance at 440 nm of the resistant dextrin is ≥85%.

Beneficial Technical Effects

The present disclosure provides a method for preparing resistant dextrin, which comprises first removing the protein in the starch milk, and then sequentially performing hydrolysis, evaporation concentration, polymerization, and refining and purification, to finally obtain the resistant dextrin. In the present disclosure, by controlling the protein content in the starch milk, the Maillard reaction is effectively reduced, which increases the content of dietary fiber in the crude product and improves the light transmittance of the product, reduces the burden of subsequent refining and purification, and reduces the consumption of activated carbon, acid and alkali, thereby reducing the cost of refining and purification.

EXPLANATION OF TERMS

The term "dextrin" refers to a low molecular weight carbohydrate produced by hydrolysis of starch. Dextrin can be prepared from starch by enzymatic digestion or heating under acidic conditions.

The term "resistant dextrin" refers to a dextrin that is resistant to a digestive enzyme in the small intestine. In addition to the α-1,4 and α-1,6 glycosidic bonds present in starch, resistant dextrin also contains α-1,2 and α-1,3 glycosidic bonds. Some reducing ends of resistant dextrin may have β-1,6 glycosidic bond. Various digestive enzymes in the human body cannot break down α-1,3, α-1,2 and α-1,6 glycosidic bonds, resulting in its enzyme resistance. It can be obtained by high-temperature degradation of starch under acidic conditions or by selective enzymatic digestion.

The term "Baume degree" refers to a way of expressing solution concentration. By dipping a Baume hydrometer into a solution being measured, the degree obtained is called Baume degree.

"−0.06 MPa" refers to pressure that is 0.06 MPa lower than 1 standard atmosphere.

DETAILED DESCRIPTION OF THE INVENTION

The embodiments of the present application will be described in detail below with reference to examples, but those skilled in the art will understand that the following examples are only used to illustrate the present application and should not be regarded as limiting the scope of the present application. If the specific conditions are not specified in the examples, the conditions should be carried out according to the conventional conditions or the conditions recommended by the manufacturer. If the manufacturer of the reagents or instruments used is not indicated, they are all conventional products that can be purchased commercially.

The present disclosure provides a method for preparing resistant dextrin, comprising the following steps:

1) mixing a starch and water, and removing a protein to obtain a starch milk;
2) mixing the starch milk obtained in the step 1) with an acid to perform a hydrolysis reaction and obtain a hydrolysis reaction solution;
3) allowing the hydrolysis reaction solution obtained in the step 2) to evaporation concentration and polymerization reaction in turn to obtain a crude resistant dextrin;
4) refining the crude resistant dextrin obtained in the step 3) to obtain the resistant dextrin.

In the present disclosure, the starch and water are mixed and the protein is removed to obtain the starch milk.

In some embodiments, the starch is preferably tapioca starch, pea starch, wheat starch or corn starch, more preferably corn starch: the water is preferably RO reverse osmosis water; the starch milk obtained after mixing the starch and the water preferably has a Baume degree of 20° Bé to 30° Bé, more preferably 22° Bé to 26° Bé.

In some embodiments, the protein removal rate is preferably ≥97%. The determination method of protein content is GB/T 22427.10 2008 "Starches and derived products-Determination of nitrogen content", and the conversion coefficient of nitrogen into protein is 6.25.

In some embodiments, the protein removal rate is preferably ≥98%.

In some embodiments, the method of removing protein is preferably vacuum rotary-drum adsorption for protein removal. During the process of removing protein by vacuum rotary-drum adsorption, the working pressure of the vacuum rotary-drum is preferably −0.04 MPa to −0.06 MPa, and the rotation speed the vacuum rotary-drum is preferably 1 min/r to 3 min/r.

In some embodiments, the starch milk contains an insoluble protein precipitate. During the process of removing protein by vacuum rotary-drum adsorption, the starch and water in the starch milk penetrate through a filter membrane on the surface of the rotary-drum and are collected and discharged, while the protein precipitate is retained by the filter membrane on the surface of the rotary-drum and is adsorbed on the surface of the rotary-drum.

In some embodiments, a filter cloth of the vacuum rotary-drum has a pore size of 60 mesh to 100 mesh.

In the present disclosure, the protein is removed before the hydrolysis reaction, and biological enzyme proteins are not added in the subsequent reactions, which effectively reduces the interference of proteins in the preparation process of the resistant dextrin, reduces side reactions, and reduces the difficulty of subsequent refining and purification.

In the present disclosure, after obtaining the starch milk, the starch milk is mixed with the acid to perform the hydrolysis reaction to obtain the hydrolysis reaction solution.

In some embodiments, the acid is preferably at least one selected from the group consisting of hydrochloric acid, phosphoric acid, citric acid and malic acid: the acid is added in the form of an acid solution: the concentration of the acid solution is preferably 1 wt % to 2 wt %; and the mass amount of the acid solution as added is preferably 1‰ to 3‰ of the starch mass.

In some embodiments, the mixing is a preferably a method of stirring. The present disclosure has no special limitation on the specific method of stirring, as long as the starch milk and the acid can be mixed evenly.

In some embodiments, the temperature of the hydrolysis reaction is preferably 85° C. to 95° C., more preferably 90° C.: the time of the hydrolysis reaction is preferably 30 min to 90 min, more preferably 50 min to 70 min, and most preferably 60 min to 65 min. In the present disclosure, the temperature of the hydrolysis reaction is controlled at 85° C. to 95° C., the pressure is normal pressure (1 standard atmosphere), which effectively reduces the generation of furfural and reduces the difficulty of subsequent refining and purification. In the present disclosure, the detection of furfural is in accordance with the detection method of 5-hydroxymethylfurfural (HMF) as set forth in Section 5.5 of GB/T 26762 2011 “Crystalline fructose, Solid fructose-glucose”.

In some embodiments, the hydrolysis reaction in the step 2) is performed at 0.9 to 1.1 standard atmospheres, preferably at 1 standard atmosphere.

After obtaining the hydrolysis reaction solution, the hydrolysis reaction solution is sequentially subjected to the evaporation concentration and the polymerization reaction to obtain the crude resistant dextrin.

In some embodiments, the pressure of the evaporation concentration is preferably −0.06 MPa to −0.098 MPa (e.g., −0.07 MPa to −0.08 MPa): the temperature of the evaporation concentration is preferably 70° C. to 85° C., more preferably 75° C. to 80° C.: the mass percentage content of the solid in the product obtained after the evaporation concentration is 80% to 85%. In some embodiments, high-vacuum low-temperature concentration is used to reduce the occurrence of side reactions and reduce the difficulty of subsequent refining and purification.

In some embodiments, the pressure of the polymerization reaction is preferably −0.06 to −0.098 MPa (e.g., −0.07 MPa to −0.08 MPa): the temperature of the polymerization reaction is preferably 110° C. to 130° C., more preferably 115° C. to 125° C., most preferably 120° C.: the polymerization reaction time is preferably 20 minutes to 30 minutes, more preferably 25 minutes.

In some embodiments, after the polymerization reaction, the crude resistant dextrin is obtained.

In some embodiments, the dietary fiber content in the crude resistant dextrin is ≥85%, and the light transmittance at 440 nm is ≥85%. In some embodiments, the dietary fiber content detection method is the second method of enzymatic gravimetric method-liquid chromatography as set forth in GB/T 22224 2008 “Determination of Dietary Fiber in Foods—Enzymatic gravimetric method, and Enzymatic gravimetric method—liquid chromatography”: the detection of the light transmittance is in accordance with the light transmittance detection method as set forth in Section 6.7 of GB/T 20881 2017 “Isomaltooligosaccharide”.

In the present disclosure, after obtaining the crude resistant dextrin, the crude resistant dextrin is dissolved in water. The water is preferably RO reverse osmosis water. After dissolving, it is refined and processed to obtain a crude resistant dextrin solution.

In some embodiments, the refining process comprises decolorization, desalination, and removal of non-dietary fiber carbohydrate compounds.

In some embodiments, the decolorization preferably comprises: adding a powdered activated carbon with a mass percentage of 3‰ to 5‰ (based on a dry basis mass of the crude resistant dextrin) into the crude resistant dextrin solution, maintaining at a temperature of 80±2° C. for a time of preferably 25 min to 35 min, more preferably 30 min, and allowing to be filtered after decolorization.

In some embodiments, the desalination preferably comprises: desalting the filtrate obtained after decolorization by ion exchange to obtain a desalted dextrin. In some embodiments, the desalting by ion exchange is performed by preferably using a strong acid cation exchange resin (model D001) and a weak base anion exchange resin (model 301P).

In some embodiments, the removal of non-dietary fiber carbohydrate compounds is preferably performed by sequentially subjecting the desalted dextrin to vacuum concentration and chromatographic separation. In some embodiments, the pressure of the vacuum concentration is preferably −0.06 MPa to −0.08 MPa; the resin used for the chromatography separation is preferably potassium type chromatography separation resin.

The present disclosure also provides a resistant dextrin prepared by the above preparation method, and in the resistant dextrin, the mass percentage content of dietary fiber is ≥90%, and the light transmittance at 440 nm is ≥85%.

In order to better understand the present disclosure, the content of the present disclosure will be further explained below in conjunction with the examples, but the content of the present disclosure is not limited only to the following examples.

Example 1

A method for preparing a resistant dextrin comprised the following steps:

1) Starch and RO reverse osmosis water were mixed to obtain a milk with a Baume degree of 23° Bé, and the obtained milk was placed in a vacuum rotary-drum to remove the protein in it. The working pressure of the vacuum rotary-drum was −0.05 MPa, and the rotation speed was 2 min/r. Thus, a starch milk with a protein removal rate of ≥98% was obtained.

2) To the starch milk obtained in the step 1), hydrochloric acid was added at an amount of 2‰ relative to the starch mass. The hydrochloric acid had a concentration of 2 wt %. After being stirred well, it was pumped into a reaction kettle, heated up to 95° C. to perform a hydrolysis reaction for a reaction time of 30 minutes to obtain a hydrolysis reaction solution.

3) The hydrolysis reaction solution obtained in the step 2) was subjected to evacuation by maintaining a pressure of −0.08 MPa and a temperature of 75° C., until the mass percentage content of solid was concentrated to 83%, then the pressure was continuously maintained at −0.08 MPa, while the temperature was raised to 130° C. to carry out polymerization reaction, and a crude resistant dextrin was obtained after 30 minutes of the reaction. After detection, the obtained crude resistant dextrin had a dietary fiber mass percentage content of 82%, and a light transmittance of 87% at 440 nm.

4) The crude resistant dextrin obtained in the step 3) was added with water and dissolved, and subjected to refining process, which comprised: the crude resistant dextrin solution was decolorized by adding powdered activated carbon at a mass percentage of 3‰ to 5‰ (relative to the dry base mass of the crude resistant dextrin), keeping the temperature at 80±2° C. for 25 min to 35 min, and then filtered: an strong acid cation exchange resin (model D001) and a weak base anion exchange resin (model 301P) were used for ion exchange desalination: after desalination, vacuum concentration was performed under −0.06 MPa to −0.08 MPa conditions: a potassium type chromatography resin was used to remove non-dietary fiber carbohydrate compounds to obtain the resistant dextrin. To refine 1 ton of the product, 5 kilograms of activated carbon, 10 kilograms of acid, and 10 kilograms of alkali were consumed.

After detection, the obtained resistant dextrin had a dietary fiber mass percentage content of 92%, and a light transmittance of 89% at 440 nm.

Example 2

A method for preparing a resistant dextrin comprised the following steps:

1) Starch and RO reverse osmosis water were mixed to obtain a milk with a Baume degree of 21° Bé, and the obtained milk was placed in a vacuum rotary-drum to remove the protein in it. The working pressure of the vacuum rotary-drum was −0.05 MPa, and the rotation speed was 2 min/r. Thus, a starch milk with a protein removal rate of ≥98% was obtained.

2) To the starch milk obtained in the step 1), hydrochloric acid was added at an amount of 3‰ relative to the starch mass. The hydrochloric acid had a concentration of 1 wt %. After being stirred well, it was pumped into a reaction kettle, heated up to 90° C. to perform a hydrolysis reaction for a reaction time of 60 minutes to obtain a hydrolysis reaction solution.

3) The hydrolysis reaction solution obtained in the step 2) was subjected to evacuation by maintaining a pressure of −0.09 MPa and a temperature of 78° C., until the mass percentage content of solid was concentrated to 85%, then the pressure was continuously maintained at −0.09 MPa, while the temperature was raised to 125° C. to carry out polymerization reaction, and a crude resistant dextrin was obtained after 28 minutes of the reaction. After detection, the obtained crude resistant dextrin had a dietary fiber mass percentage content of 81.5%, and a light transmittance of 88% at 440 nm.

4) The crude resistant dextrin obtained in the step 3) was added with water and dissolved, and subjected to refining process, which comprised: the crude resistant dextrin solution was decolorized by adding powdered activated carbon at a mass percentage of 3‰ to 5‰ (relative to the dry base mass of the crude resistant dextrin), keeping the temperature at 80±2° C. for 25 min to 35 min, and then filtered: an strong acid cation exchange resin (model D001) and a weak base anion exchange resin (model 301P) were used for ion exchange desalination: after desalination, vacuum concentration was performed under −0.06 MPa to −0.08 MPa conditions: a potassium type chromatography resin was used to remove non-dietary fiber carbohydrate compounds to obtain the resistant dextrin. To refine 1 ton of the product, 5 kilograms of activated carbon, 10 kilograms of acid, and 10 kilograms of alkali were consumed.

After detection, the obtained resistant dextrin had a dietary fiber mass percentage content of 91%, and a light transmittance of 88% at 440 nm.

Example 3

1) Starch and RO reverse osmosis water were mixed to obtain a milk with a Baume degree of 20° Bé, and the obtained milk was placed in a vacuum rotary-drum to remove the protein in it. The working pressure of the vacuum rotary-drum was −0.04 MPa, and the rotation speed was 3 min/r. Thus, a starch milk with a protein removal rate of ≥98% was obtained.

2) To the starch milk obtained in the step 1), hydrochloric acid was added at an amount of 1‰ relative to the starch mass. The hydrochloric acid had a concentration of 2 wt %. After being stirred well, it was pumped into a reaction kettle, heated up to 85° C. to perform a hydrolysis reaction for a reaction time of 90 minutes to obtain a hydrolysis reaction solution.

3) The hydrolysis reaction solution obtained in the step 2) was subjected to evacuation by maintaining a pressure of −0.06 Mpa and a temperature of 85° C., until the mass percentage content of solid was concentrated to 80%, then the pressure was continuously maintained at −0.06 Mpa, while the temperature was raised to 110° C. to carry out polymerization reaction, and a crude resistant dextrin was obtained after 30 minutes of the reaction. After detection, the obtained crude resistant dextrin had a dietary fiber mass percentage content of 83%, and a light transmittance of 86% at 440 nm.

4) The crude resistant dextrin obtained in the step 3) was added with water and dissolved, and subjected to refining process, which comprised: the crude resistant dextrin solution was decolorized by adding powdered activated carbon at a mass percentage of 3‰ to 5‰ (relative to the dry base mass of the crude resistant dextrin), keeping the temperature at 80±2° C. for 25 min to 35 min, and then filtered: an strong acid cation exchange resin (model D001) and a weak base anion exchange resin (model 301P) were used for ion exchange desalination; after desalination, vacuum concentration was performed under −0.06 MPa to −0.08 MPa conditions: a potassium type chromatography resin was used to remove non-dietary fiber carbohydrate compounds to obtain the resistant dextrin. To refine 1 ton of the product, 5 kilograms of activated carbon, 10 kilograms of acid, and 10 kilograms of alkali were consumed.

After detection, the obtained resistant dextrin had a dietary fiber mass percentage content of 93%, and a light transmittance of 87% at 440 nm.

Example 4

1) Starch and RO reverse osmosis water were mixed to obtain a milk with a Baume degree of 30° Bé, and the obtained milk was placed in a vacuum rotary-drum to remove the protein in it. The working pressure of the vacuum rotary-drum was −0.06 MPa, and the rotation speed was 1 min/r. Thus, a starch milk with a protein removal rate of ≥98% was obtained.

2) To the starch milk obtained in the step 1), phosphoric acid was added at an amount of 3‰ relative to the starch mass. The phosphoric acid had a concentration of 2 wt %. After being stirred well, it was pumped into a reaction kettle, heated up to 90° C. to perform a hydrolysis reaction for a reaction time of 60 minutes to obtain a hydrolysis reaction solution.

3) The hydrolysis reaction solution obtained in the step 2) was subjected to evacuation by maintaining a pressure of −0.098 MPa and a temperature of 70° C., until the mass percentage content of solid was concentrated to 85%, then the pressure was continuously maintained at −0.098 MPa, while the temperature was raised to 120° C. to carry out polymerization reaction, and a crude resistant dextrin was obtained after 20 minutes of the reaction. After detection, the obtained crude resistant dextrin had a dietary fiber mass percentage content of 82.3%, and a light transmittance of 89% at 440 nm.

4) The crude resistant dextrin obtained in the step 3) was added with water and dissolved, and subjected to refining process, which comprised: the crude resistant dextrin solution was decolorized by adding powdered activated carbon at a mass percentage of 3‰ to 5% (relative to the dry base mass of the crude resistant dextrin), keeping the temperature at 80±2° C. for 25 min to 35 min, and then filtered: an strong acid cation exchange resin (model D001) and a weak base anion exchange resin (model 301P) were used for ion exchange desalination: after desalination, vacuum concentration was performed under −0.06 MPa to −0.08 MPa conditions: a potassium type chromatography resin was used to remove non-dietary fiber carbohydrate compounds to obtain the resistant dextrin. To refine 1 ton of the product, 5 kilograms of activated carbon, 10 kilograms of acid, and 10 kilograms of alkali were consumed.

After detection, the obtained resistant dextrin had a dietary fiber mass percentage content of 91.5%, and a light transmittance of 90% at 440 nm.

Comparative Example 1

The protein removal step was omitted, and other implementation conditions were the same as the Example 1 to obtain a resistant dextrin.

After detection, the obtained resistant dextrin had a dietary fiber mass percentage content of 81%, and the light transmittance of 35% at 440 nm.

To refine 1 ton of the product, 20 kilograms of activated carbon, 30 kilograms of acid, and 30 kilograms of alkali were consumed.

After detection, the obtained resistant dextrin had a dietary fiber mass percentage content of 90.5%, and the light transmittance of 65% at 440 nm.

Comparative Example 2

The dextrinization reaction was carried out according to a traditional method, and other conditions were the same as in the Example 1 to obtain a resistant dextrin. The steps were as follows:

1) A starch milk was prepared according to Example 1.

2) To the starch milk obtained in step 1), hydrochloric acid was added at an amount of 2‰ relative to the starch mass. The hydrochloric acid had a concentration of 2 wt %. After being stirred well, it was pumped into a reaction kettle, and underwent dextrinization reaction by maintaining the pressure at −0.06 MPa to −0.098 MPa, the temperature at 140° C. to 160° C. for 30 min to 40 min to a crude resistant dextrin. After detection, the obtained crude resistant dextrin had a dietary fiber mass percentage content of 55%, and a light transmittance of 75% at 440 nm.

3) The refining process was the same as in the Example 1. To refine 1 ton of the product, 30 kilograms of activated carbon, 35 kilograms of acid, and 35 kilograms of alkali were consumed.

After detection, the obtained resistant dextrin had a dietary fiber mass percentage content of 89%, and a light transmittance of 78% at 440 nm.

Comparative Example 3

A resistant dextrin was prepared according to a traditional method, and the steps were as follows:

1) To starch, hydrochloric acid solution at a mass percentage of 10% was added. The hydrochloric acid concentration was 1 wt %. After mixing well and filtrating, the mixture was subjected to dextrinization reaction for 30 min to 40 min under vacuum, the pressure was maintained at −0.06 MPa to −0.098 MPa, and the temperature was 140° C. to 160° C. to obtain a crude resistant dextrin. After detection, the obtained crude resistant dextrin had a dietary fiber mass percentage content of 50%, and a light transmittance of 20% at 440 nm.

2) The refining process was the same as in the Example 1. To refine 1 ton of the product, 50 kilograms of activated carbon, 45 kilograms of acid, and 45 kilograms of alkali were consumed.

After detection, the obtained resistant dextrin had a dietary fiber mass percentage content of 85%, and a light transmittance of 60% at 440 nm.

Table 1 showed the dietary fiber contents and light transmittance at 440 nm of the crude and finished resistant dextrins of Examples 1 to 4 and Comparative Examples 1 to 3.

TABLE 1

Dietary fiber content and light transmittance of crude and finished resistant dextrins

| | Dietary fiber content in crude product | Light transmittance of crude product | Dietary fiber content in finished product | Light transmittance of finished product |
|---|---|---|---|---|
| Example 1 | 82% | 87% | 92% | 89% |
| Example 2 | 81.5% | 88% | 91% | 88% |
| Example 3 | 83% | 86% | 93% | 87% |
| Example 4 | 82.3% | 89% | 91.5% | 90% |
| Comparative Example 1 | 81% | 35% | 90.5% | 65% |
| Comparative Example 2 | 55% | 75% | 89% | 78% |
| Comparative Example 3 | 50% | 20% | 85% | 60% |

It could be seen from Table 1 that the dietary fiber contents in the crude products of Examples 1 to 4 and Comparative Example 1 had significantly increased, indicating that in the present application, by removing protein before the reaction, dividing the traditional dextrinization reaction into hydrolysis reaction, evaporation concentration and polymerization reaction, and controlling the corresponding conditions and parameters, the dietary fiber contents of the crude products could be significantly increased. The light transmittance of the crude products of Examples 1 to 4 were significantly improved compared to those of Comparative Examples 1 to 3; although the light transmittance of the crude product of Comparative Example 2 was lower than those of Examples 1 to 4, it was significantly higher than those of Comparative Examples 1 and 3, indicating that by controlling the protein content in the starch milk, the light transmittance of the crude resistant dextrin could be significantly increased. The dietary fiber contents of the finished products of Examples 1 to 4 were slightly higher than those of Comparative Examples 1 to 3, but the light transmittance values of the finished products had been significantly improved, and the light transmittance of the finished product of Comparative Example 2 was also higher than those of Comparative Examples 1 and 3, indicating that by controlling the protein content in the starch milk, the light transmittance of finished resistant dextrin products could be significantly increased.

Table 2 showed the consumption of activated carbon and acid and alkali during the refining process of Examples 1 to 4 and Comparative Examples 1 to 3.

TABLE 2

Consumption of activated carbon and acid and alkali during the refining process

| | Consumption of activated carbon (kg) | Consumption of each of acid and alkali (kg) |
|---|---|---|
| Example 1 | 5 | 10 |
| Example 2 | 5 | 10 |

TABLE 2-continued

Consumption of activated carbon and acid and alkali during the refining process

| | Consumption of activated carbon (kg) | Consumption of each of acid and alkali (kg) |
|---|---|---|
| Example 3 | 5 | 10 |
| Example 4 | 5 | 10 |
| Comparative Example 1 | 20 | 30 |
| Comparative Example 2 | 30 | 35 |
| Comparative Example 3 | 50 | 45 |

It could be seen from Table 2 that in Examples 1 to 4, the consumption of activated carbon and acid and alkali could be significantly reduced, and the consumption of activated carbon and acid and alkali of Comparative Examples 1 and 2 could also be significantly reduced as compared to Comparative Example 3. In combination with the light transmittance results of the finished products in Table 1, it could be found that in Comparative Examples 1 and 3, the light transmittance of the final products could not be effectively improved even after being refined, which indicated that the removing protein before the reaction could effectively reduce the difficulty of subsequent refining, and the light transmittance of the final resistant dextrin product could be effectively ensured when the consumption of activated carbon and acid and alkali was reduced.

In combination with Table 1 and Table 2, it could be seen that in the present application, by combining the removing protein before reaction and the dividing traditional dextrinization reaction, the overall process showed a synergetic effect, the dietary fiber content and light transmittance of the resistant dextrin product could be effectively improved, and the consumption of activated carbon and acid and alkali during the refining process could be remarkably reduced, thereby significantly reducing the refining cost.

According to the detection method of 5-hydroxymethylfurfural (HMF) as set forth in Section 5.5 of GB/T 26762 2011 "Crystalline fructose, Solid fructose-glucose", the furfural contents of the crude/finished resistant dextrin products were detected.

TABLE 3

| | Furfural content of crude product | Furfural content of finished product |
|---|---|---|
| Example 1 | 0.072% | 0.041% |
| Example 2 | 0.071% | 0.040% |
| Example 3 | 0.073% | 0.042% |
| Example 4 | 0.069% | 0.039% |
| Comparative Example 1 | 0.192% | 0.081% |
| Comparative Example 2 | 0.188% | 0.075% |
| Comparative Example 3 | 0.203% | 0.101% |

Although the specific embodiments of the present disclosure have been described in detail, those skilled in the art will understand that various modifications and changes can be made to the details based on all the teachings that have been disclosed, and these changes are within the protection scope of the present disclosure. The full scope of the present disclosure is given by the appended claims and any equivalents thereof.

What is claimed is:

1. A method for preparing resistant dextrin, comprising the following steps:

1) Mixing a starch with water, and removing a protein to obtain a starch milk, the mixture obtained after mixing the starch and the water in the step 1) has a starch milk baume degree of 20° Bé to 30° Bé, the protein removal rate in the step 1) is ≥98%;

2) mixing the starch milk obtained in the step 1) with an acid to perform hydrolysis reaction and obtain a hydrolysis reaction solution, in which the acid is at least one selected from the group consisting of hydrochloric acid, phosphoric acid, citric acid, and malic acid; the acid is added in the form of an acid solution; the acid solution has a concentration of 1 wt % to 2 wt %; the acid solution is added at a mass amount of 1% % to 3% % relative to the starch mass; and a temperature of the hydrolysis reaction is 85° C. to 95° C. and a time of the hydrolysis reaction is 30 min to 90 min;

3) allowing the hydrolysis reaction solution obtained in the step 2) to undergo evaporation concentration and polymerization reaction in turn to obtain a crude resistant dextrin; and 4) Refining the crude resistant dextrin obtained in the step 3) to obtain the resistant dextrin.

2. The method for preparing resistant dextrin according to claim 1, wherein the method of removing protein is vacuum rotary-drum adsorption for protein removal.

3. The method for preparing resistant dextrin according to claim 2, wherein during a process of the protein removal by vacuum rotary-drum adsorption, a working pressure of the vacuum rotary-drum is −0.04 MPa to −0.06 MPa and a rotation speed of the vacuum rotary-drum is 1 min/r to 3 min/r.

4. The method for preparing resistant dextrin according to claim 1, wherein in the step 3), a pressure of the evaporation concentration is −0.06 MPa to −0.098 MPa, a temperature of the evaporation concentration is 70° C. to 85° C., and the evaporation concentration is carried out to an extent that the mass percentage of solids is 80% to 85%.

5. The method for preparing resistant dextrin according to claim 1, wherein in the step 3), a polymerization reaction pressure is −0.06 MPa to −0.098 MPa, a polymerization reaction temperature is 110° C. to 130° C., and a polymerization reaction time is 20 min to 30 min.

6. The method for preparing resistant dextrin according to claim 1, wherein in the step 4), the refining comprises decolorization, desalination, and removing a non-dietary fiber carbohydrate compound.

7. The method for preparing resistant dextrin according to claim 4, wherein in the step 3), a polymerization reaction pressure is −0.06 MPa to −0.098 MPa, a polymerization reaction temperature is 110° C. to 130° C., and a polymerization reaction time of 20 min to 30 min.

* * * * *